United States Patent [19]

Pasch

[11] Patent Number: 5,018,214

[45] Date of Patent: May 21, 1991

[54] METHOD AND APPARATUS FOR IDENTIFYING DISCRETE OBJECTS IN A VISUAL FIELD

[75] Inventor: Nicholas E. Pasch, Redwood City, Calif.

[73] Assignee: LSI Logic Corporation, Milpitas, Calif.

[21] Appl. No.: 210,596

[22] Filed: Jun. 23, 1988

[51] Int. Cl.$^5$ ............................................. G06K 9/34
[52] U.S. Cl. ........................................ 382/9; 377/10; 382/26
[58] Field of Search ..................... 382/9, 26; 377/10

[56] References Cited

U.S. PATENT DOCUMENTS

| | | | |
|---|---|---|---|
| 4,183,013 | 1/1980 | Agrawala et al. | 382/26 |
| 4,189,711 | 2/1980 | Frank | 382/26 |
| 4,624,013 | 11/1986 | Urushibata | 382/26 |
| 4,630,306 | 12/1986 | West et al. | 382/26 |

*Primary Examiner*—Leo H. Boudreau
*Attorney, Agent, or Firm*—Skjerven, Morrill, MacPherson, Franklin & Friel

[57] ABSTRACT

The processing time for identifying discrete objects in a visual field composed of pixels is reduced by establishing indirect links between points of occurrence in the array and object names in an object designation list.

18 Claims, 6 Drawing Sheets

METHOD AND APPARATUS FOR IDENTIFYING DISCRETE OBJECTS IN A VISUAL FIELD

BACKGROUND OF THE INVENTION

1. Field of the Invention

The present invention relates to digital image processing and more specifically to the problem of instructing a computer or other automated machine how to identify discrete objects in a visual field composed of a large array of pixels.

2. Description of the Prior Art

Visual imagery is often presented in digitized form as a large array of pixels, with each pixel providing information about physical characteristics of a point on a spatial grid. The pixel information could indicate, by way of example, how much light is reflected from a grid point on an illuminated surface, what the chemical composition of the point is or some other distinguishing attribute associated with the point.

A problem with such pixel arrays is that major features of the visual image tend to become obscured by the process of breaking up the whole into minute parts. The forest is lost, so to speak, when one's focus is restricted to looking at a small number of trees. Computers have this problem when they analyze only a small number of pixels at a time in a large pixel array. It has been believed that the best way to recognize major features of the undigitized original image is by displaying the entire pixel array on a viewing screen in an orderly fashion using different colors, tones of gray, or even simple black and white to represent one or more of the characteristics of each point, and using the human eye to identify and categorize the features by reintegrating the plural pixels into a contiguous whole. The process by which such feature identification and categorization takes place is not fully understood. It would be advantageous if computers could be taught to replicate the process and recognize major features in a digitized image with at least the speed of the human eye. Analysis of visual imagery could be automated and this would facilitate image study which would be either too complex or too tedious for humans.

Some steps have been taken towards teaching computers how to recognize features in an image. A definition is first formulated for instructing a computer how to distinguish between a pixel that belongs to a major feature and a pixel that does not belong to any feature at all. Neighboring pixels which share a common trait, as for example a reflected light intensity equal to or less than a predetermined threshold, can be defined as belonging to a common entity which will be termed an "object." In a Cartesian type of array, two pixels can be defined to neighbor one another and thus belong to a common object if they are directly adjacent to one another either vertically, horizontally or diagonally. A pixel which has no immediate neighbors with similar traits can be considered an object by itself. Background portions of a visual image may be considered non-objects and ignored.

The human eye can identify and simultaneously categorize a respectable number of discrete objects in a visual field with simplicity and speed (usually a few seconds) just by "looking." Previous attempts to replicate this function in automated machinery have generally failed to either match or reduce the recognition time of the human eye, particularly when the digitized image presented is filled with a large number of complex objects. Some analysis methods require hours or even weeks to sort out discrete objects in fields that take the human eye merely one or two seconds. One reason for such long processing times will be explained with reference to FIGS. 1 and 2 of the accompanying drawings.

FIG. 1 illustrates a digitized visual field 10 containing a number of relatively noncomplex, discrete features denoted as objects a, b, c and d. The purpose of FIG. 1 is merely to give an example of what a digitized visual field might look like. The original visual field (prior to digitization) is indicated by dashed outlines. It might have been a plan view of a printed circuit board having a plurality of maze-like conductive paths and perhaps certain defects, or it might have been a telescopic view of geophysical features as seen from a space satellite, or it might again have been a small portion of a semiconductive substrate as seen through a scanning electron microscope. The original nature of the illustrated objects is not important for this part of the discussion. The problem here is to determine by means of automated machinery whether each of the pixels belongs to one or another of a plurality of objects (denoted by dots and dashed outlines in FIG. 1). For the sake of generality objects will be generically identified by object names, each being denoted by an underlined small letter: a, b, c and so forth. Discrete objects will be defined as being composed of one or more pixels sharing some predetermined trait ("attribute") that is distinguishable from a "background" trait. When an object has more than one pixel, each pixel of the object needs to be (under the definition chosen above) directly adjacent to at least one other pixel having the same trait. The presence of the predetermined trait at a grid point will be termed an "occurrence." Areas in the visual field where the trait does not occur will be defined as regions of non-occurrence or simply as background.

In real world applications, a visual field may be broken up and digitized into hundreds or thousands if not millions of pixels. Each of the pixels conveys information only about its respective point on a spatial grid. Even though it is possible to construct a computer that can determine in perhaps ten microseconds or less whether any one occurrence neighbors another, the time for processing a large number of data points in a visual field, particularly when those data points may need to be scanned repeatedly in a recursive manner, can be quite staggering (e.g. on the order of hours, weeks or even longer). More specifically, if an array has N pixels and the method for processing the N pixels requires recursion, the time for such processing will grow roughly as a function of N-factorial for a given increase of N. ($N\text{-}factorial = N \times [N-1] \times [N-2] \ldots \times [3] \times [2] \times [1]$.)

There is shown in FIG. 2 a small array 10' of pixels including occurrences belonging to a W-shaped object. The small array 10' is obviously smaller and much simpler than the array 10 of FIG. 1. The latter is relatively noncomplex in comparison to image analysis situations found in every day life (the so called "real world"). The processing time required for complex image analysis can be appreciated by extrapolating from the soon-to-be-described problem of the simple array 10' to the more-complex arrays found in real world situations using the N-factorial based yardstick given above. As N grows into hundreds and thousands of pixels, the associated processing time can leap from hours to weeks, months and even years. Such long periods for obtaining analysis results are unacceptable in most settings.

One reason the human eye can detect the singularity of the W-shaped object shown in array 10' readily and in short time is because the eye can view the entire image at once. A computer is often limited to looking at the pixels of an array through a window that is much smaller than the entire array. The task of recognizing that the scattered occurrences, as viewed through a small window, all belong to one object presents a problem.

Horizontal rows of the array 10' will be denoted by R1-R8. Vertical columns of the array will be denoted by C1-C9. The array 10' is shown split open between rows R3 and R4 in order to emphasize a point and enhance understanding of how a computer might perceive the array when the computer is performing either a top to bottom scan or a bottom to top scan. Since arrays are normally scanned first left to right by individual rows and then top to bottom by stepping from the processing of one row to the processing of a second row below, this standard scanning method will be followed in the below explanation.

The scanning is to be performed by an automated scanning machine. FIG. 2 shows, in addition to the array 10', a block diagram of an object identifying apparatus 20 comprised of an automated scanning machine 22 and a data storage memory 24. The memory 24 is structured to support a single object assignment table 24a. Partitioning among the system components 10', 22 and 24 is done merely for sake of example. The scanning machine 22 could be a contiguous portion of a general purpose computer. It could, on the other hand, be some sort of test instrument capable of repeatedly scanning a physical specimen in response to computer instructions. The array 10' could represent a set of data stored in array-like fashion in a memory of a general purpose computer or it could be a depiction of actual sample points on the surface of a tangible specimen. The problem to be described is generic to various types of system configurations.

As the computer or other image scanning machine 22 begins to scan across row R1 of array 10', it will encounter a first occurrence (e.g., a pixel of a particularly high intensity) at column C2. The occurrence is denoted by the asterisk "*" at row R1, column C2. The computer can assume that this first occurrence (R1,C2) belongs to a first object, a. The computer records this assumption at a first addressed location (ADDR 1) of memory 24.

Scanning further along the first row R1, the computer encounters a second occurrence (again denoted by an asterisk) at column C5. Since the occurrence at column C5 is not directly adjacent to the occurrence at column C2, the computer must initially assume that this second occurrence at column C5 belongs to a second object b which is distinct from the first object a. It records this assumption at a second location (ADDR 2) in the memory 24. Further along row R1 the computer detects yet another isolated occurrence at column C8 and records the same as belonging to a third object c in a third location (ADDR 3) of its memory 24.

In scanning row R2, the computer will find a fourth occurrence at column C2 which is directly adjacent to the previously encountered occurrence at column C2 of row R1. It is assumed here that the computer 22 has a finite scan window 22a having a height of just two rows, and that the computer can identify the object names a, b, c, etc., assigned to occurrences in an upper row of the window 22a as well as object names assigned to already processed occurrences in a currently scanned lower row (also referred to as the focal row of the window). Since an "object" is defined as a continuum of directly adjacent occurrences (asterisks), the computer can safely conclude that the fourth encountered occurrence, at row R2, column C2, belongs to the same object a as that of the first occurrence directly above it and the computer will record this conclusion in memory 24.

At this point, a table 24a has been built in the memory 24 designating the first and fourth encountered occurrences (R1,C1 and R2,C2) as belonging to object a, the second encountered occurrence (R1,C5) as belonging to object, b, and the third encountered occurrence (R1,C8) as belonging to object, c. This procedure is repeated and the designation table 24a in memory 24 consequently becomes larger and larger while still continuing to erroneously identify occurrences in column C2 as belonging to a first object, a, occurrences in column C5 as belonging to a distinct second object, b, and occurrences in column C8 as belonging to a third distinct object, c. It should be appreciated from the split shown between rows R3 and R4 that the change of pattern shown in rows R4-R8, where two previously unconnected branches of the W-shape meet, could conceivably occur thousands of rows below rows R1-R3 rather than just immediately below and that the designation table 24a of memory 24 could have grown to include a very large number of erroneous entries before the change of pattern in row R5 is detected.

When the computer hits row R5, it will encounter a dilemma. The occurrence at row R5, column C3, can safely be designated as belonging to the a object because it is directly adjacent to the occurrence in the row above at R4,C2 which had previously been designated as belonging to object a. But when the computer next focuses on the occurrence in row R5, column C4, it will find one occurrence (asterisk at R5,C3) belonging to object a directly to the left of the focal point and another occurrence (asterisk at R4,C5) diagonally adjacent to the focal point, belonging to the second object b. The computer will now realize that it has made a mistake and that all the occurrences (asterisks) linking down from above the scan window 22a to the occurrence of R4,C5 need to be redesignated as belonging to object a rather than object b. But the computer cannot simply look at all the upper rows R1-R4 in one glance, find the connected occurrences and correct their object designations. The scanning window 22a is limited to detecting just two rows at a time. The computer has to recursively shift its scanning window backwards row by row to rescan rows R1 through R4 and further has to track backwards through memory 24 to change all the b designations of table 24a to a designations.

The task would be fairly simple if the computer somehow knew, as we know, that all the occurrences connected to the focal point R5,C4 are arranged in a straight vertical line. But this is not the case. The string of occurrences rooted to and emanating upwardly from the focal point R5, C4 could conceivably branch off along an infinite number of continuous patterns other than the simple one used in our example. The illustrated W-shaped object could, for instance, be a small part of a large meandering surface crack that has hundreds of randomly arranged branches and sub-branches. It would be inappropriate for the computer to make any assumption about the nature of the pattern. Recursion is the only solution known for correcting the designation table 24a.

The need for recursion stems from what can be called a "saddle point" or U-shaped connection where one branch of an object meets for the first time during a scan with another branch of the object. While only two saddle points occur in the W-shaped object of FIG. 2, it should be appreciated that saddle points can appear in large numbers and in all sorts of ways when fields far more complex than the one of FIG. 2 are considered. It is possible to construct zig-zag patterns extending laterally that have saddle points at every other column of a scanned row. This type of zig-zagging commonly occurs in the real world when objects having ill defined edges are digitized.

One way to reduce recursion time would be to record the location of all once-encountered occurrences so the computer doesn't have to hunt for them again while back tracking through memory table 24a. But it would be undesirable to have the location coordinates of each and every occurrence (*) of a large array (e.g., FIG. 1) stored in the computer's memory 24 because such storage would consume massive amounts of memory, replicate the function of the large array 10' and make the computer's use of limited resources inefficient. As such, the computer is preferably instructed to process all previous entries of table 24a (rows R4 back to R1 in our example) in a recursive manner and the scanning machine 22 is simultaneously instructed to rescan every previously scanned pixel of the array 10' in order to correctly identify the improperly assigned occurrence designations of memory 24 and flip those entries in memory table 24a from b's to a's. This means that the scanning machine 22 can not be a single scan type of device.

Needless to say, the automated scanning machine 22 of our example (FIG. 2) will again need to rescan rows R6 back through R1 when the occurrence at row R7, column C7, is investigated and found to be a saddle point linking the branch that was thought to be object c to a branch of object a. Those skilled in the art will appreciate that the processing time for investigating N points in a visual array will grow at a rate which is approximately a function of N-factorial when such recursion is required. This represents an unacceptably large processing time for many applications.

SUMMARY OF THE INVENTION

It is an object of the present invention to obviate the need for recursively scanning through a pixel array when correcting improperly made object designations. This is done in accordance with the present invention by constructing a first table in memory comprised of one or more indirect pointers which point to a second table containing one or more object designations.

Rather than entering an object designation in a single table for each occurrence encountered during a scan, a pointer is added to the first table (pointer table) to point to an object designation entered in the second table (designation table). The pointers of a simple continuum of two or more occurrences are preferably set equal to one another so that they all point to a single object name stored in a single location of the second table. If it is later discovered that a wrong object designation has been made, the contents of the single location in the designation table (second table) are changed and this automatically changes the designation of the two or more occurrences having pointers pointing to that object name in the designation table. The need for back tracking is eliminated and processing time is shortened substantially.

BRIEF DESCRIPTION OF THE DRAWINGS

The invention will be described in further detail by reference to the accompanying drawings in which.

DETAILED DESCRIPTION OF THE INVENTION

The following description is of the best modes presently contemplated for carrying out the invention. The description of these modes is intended to be merely illustrative and is not to be taken in a limiting sense. The scope of the claimed invention is best determined by reference to the appended claims.

Figure 3:
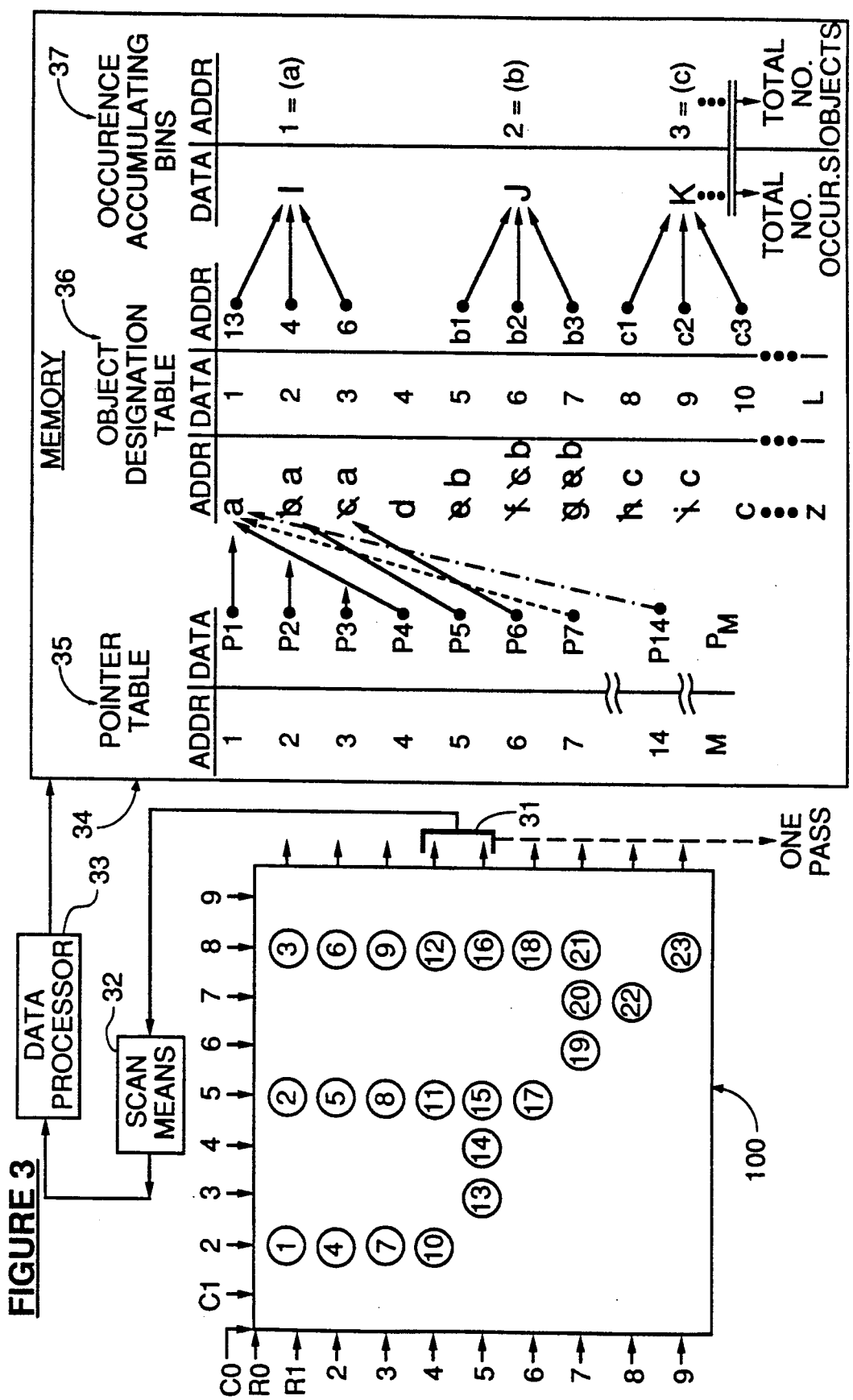
FIG. 3 is a block diagram of an object identifying system in accordance with the present invention.

FIG. 3 is a block diagram of an object identifying system 30 in accordance with the present invention. The object identifying system 30 comprises a scanning machine 32 for scanning a plurality of pixels contained in a pixel array 100, a data processor means 33 for processing data produced by the scanning means 32, and a memory means 34 for storing, in the form of at least two tables, data produced by the data processor means 33. The scanning means 32 has a two row scanning window 31 associated therewith that is preferably used in accordance with the present invention to scan the pixel array 100 from top to bottom in just one pass.

It should be understood that the partitioning of recited functions is provided here merely for illustrative purposes. The scanning means 32, data processor means 33 and memory means 34 could all be contiguous portions of a general purpose computer. On the other hand, the present invention is not limited to any one configuration. The scanning means 32 of the present invention is not required to be either directly connected to or completely responsive to the processor means 33. The present invention can resolve all object identity conflicts with just one pass of the scan window 31 and the scanning means 32 can therefore be a non-repetitive type of sequential data generating device, separate from the processor means 33, which generates data in a sequential manner for serial transfer to the processor means 33 and/or for storage on a sequential medium such as a magnetic tape. A one pass transfer of data stored on the sequential medium to the processor means 33 would effect what is termed here as a one pass movement of the scan window 31. Naturally, in the latter case, the processor would have some storage means (not shown) for temporarily retaining the data of the scanning window 31.

It should furthermore be understood that the array 100 could be configured in the form of plural data entries stored in a memory device or in a storage medium with the memory device/medium being physically separate from the combination of the processor means 33 and the memory means 34, or, that the array 100 could be data stored in a contiguous part of memory means 34, or that the array 100 could be representative of physical points (to be scanned in real time) which are located on an actual specimen. In the latter case, the scanning means 32 might include a physical scanning device such as a scanning electron microscope for scanning points on the specimen surface in real time. The reduced processing time of the disclosed object identifying method opens the way for analyzing complex specimens in real time under commercial time restraints (e.g. obtaining analysis results in a matter of seconds or minutes rather than weeks or months).

The memory means 34 of FIG. 3 is structured to include three major sections: a pointer table 35, an object designation table 36 and an occurrence accumulating bins table 37. This structuring of the memory 34 could be established by software control using the processor means 33 or by hardwire design, as desired. At the end of a process to be described below, the occurrence accumulating bins table 37 will contain a data list whose length may be used to specify the total number of discrete objects in the scanned array 100 and whose elements may be used to specify the number of occurrences (occurrence density) associated with each of the discrete objects in an object population. An object number versus object density graph (e.g., a population distribution plot) can be easily constructed from such a data list as will be explained later with reference to FIG. 7.

Figure 1:
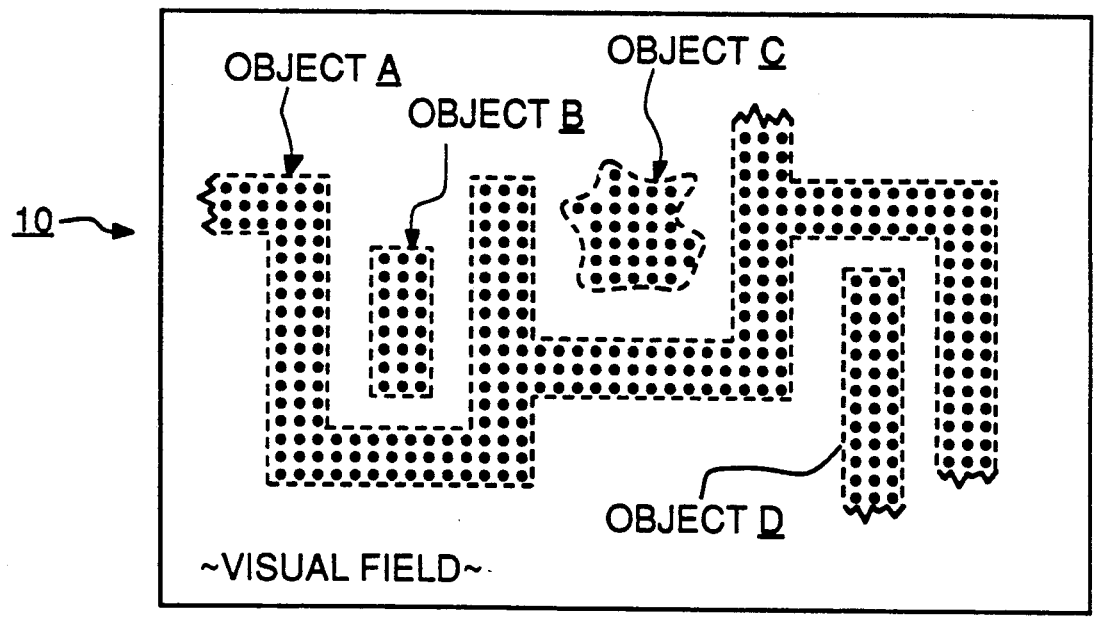
FIG. 1 is a plan view showing an example of a visual field that is digitized into an array of pixels.
Figure 2:
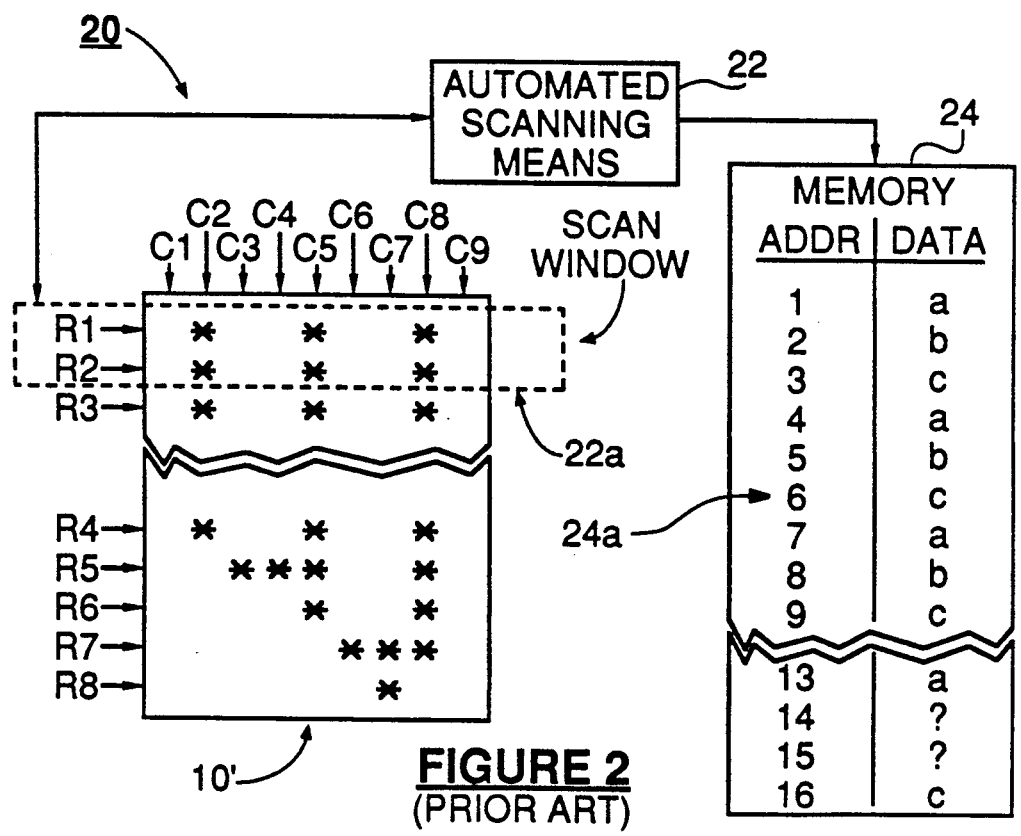
FIG. 2 is a block diagram for explaining the operation of a previous object identifying system.

The pixel array 100 of FIG. 3 is drawn to contain substantially the same W-shaped object as was shown in FIG. 2. Occurrences are now represented by circled numbers rather than asterisks. Rows and columns are respectively designated by RxCx as done earlier.

Processing begins with the scan window 31 covering a blank border row R0 (defined as having no occurrences therein) and a first row R1 of the pixel array 100. A complementary border column C0 that is also blank (no occurrences) may be similarly defined to the left of column C1. The inclusion of blank border rows and columns is optional but they are preferably used to avoid initialization problems when edges of the array 100 are investigated by a general purpose scanning routine.

As the scanning means 32 scans from left to right across the first row R1, it will encounter a first occurrence (1) at R1C2 in its scanning window 31. The scanning means 32 will focus on the newly detected occurrence (referred to hereafter as the focal point) and will investigate neighboring points immediately above (points R0C1, R0C2 and R0C3), to the left (point R1C1) and to the right (point R1C3). The scanning means 32 will indicate to the data processor 33 that there are no occurrences detected in the five points surrounding the focal point R1C2. Based on this information, the data processor 33 can determine that the occurrence (1) at the focal point, R1C2, belongs to a distinct first object which it can arbitrarily call object a.

Instead of directly associating the object name a with the first occurrence (1), the computer (processor) enters the object name a in a first location (address 1) of the object designation table 36 and enters a pointer P1 at a first address (address 1) of the pointer table 35, with pointer P1 set to point to the first address of the object designation table 36. As an optional step, the processor 33 can increment a number-of-pointers accumulating bin (also at address 1 of table 36) which indicates the number of pointers pointing to the first address of the object designation table 36. It will be seen later that the number of pointers pointing to each address of table 36 indicates the number of occurrences in a specific branch of each object, and that by summing the number of occurrences of every branch, one can determine the total number of occurrences in each discrete object.

Incidentally, it is to be understood that the descriptions made herein of the scanning means performing a particular function rather than the processor means performing that particular function are provided as such merely for the sake of illustration. Those skilled in the art will appreciate that the functions could be partitioned, as desired, among a number of discrete devices (e.g., processor and scanner) or consolidated into the operation of a single integrated device, i.e. a general purpose computer.

The scanning means 32 continues scanning across the first row R1 of array 100 and next encounters a second occurrence (2) at location R1C5. Upon investigation of the five neighboring points above and to the sides of this new focal point, R1C5, the scanning means will find that no occurrences are in direct contact with the second occurrence (2). When the scanning means 32 reports this information to the data processor 33, the data processor will determine that the second occurrence (2) probably belongs to a new object which it will arbitrarily name as object b. The name of the new object b is entered at a second address (address 2) of the object designation table 36 and a second pointer P2, pointing to address 2 of table 36, is entered at a second location (address 2) of the pointer table 35. An accumulating bin indicating the number of pointers pointing to address 2 of table 36 may be optionally incremented at this time.

The process repeats with a third occurrence (3) being encountered at location R1C8. The name of a third new object c is entered at a third location of table 36, a third pointer P3 pointing to address 3 of table 36 is entered at address 3 of table 35, and a pointer accumulating bin associated with address 3 of table 36 is optionally incremented to indicate the number of pointers pointing to address 3 of the object designation table 36.

When the end of the first row R1 is detected, the scanning means 32 causes its window 31 to step down by one row so that the scanning window 31 now covers rows R1 and R2 of the array 100. The lower row, R2, of the scanning window 31 now becomes the new focal row and each point where an occurrence is detected will be processed as a new focal point. A fourth occurrence (4) is detected at location R2C2. Upon investigation of the upper and side points surrounding the focal point, R2C2, the scanning means 32 finds that the first occurrence (1) is a neighbor. The data processor 33 then assumes that the fourth occurrence (4) belongs to the same object as does the first occurrence (1). At address 4 of the pointer table 35, the processor enters a fourth pointer P4 having the same value as the first pointer P1 entered at address 1 of the pointer table 35. Pointer P4 will thus point to the same object name a as does the first pointer P1. The pointer accumulating bin for address 1 of table 36 will be optionally incremented at this time to indicate that there are now two pointers, P1 and P4, pointing to address 1 of table 36.

Moving on to the fifth occurrence (5) at location R2C5, the scanning means 32 finds that the second occurrence (2) is a neighbor. The data processor 33 causes address 5 of the pointer table 35 to "inherit" the pointer of address 2 of the pointer table 35. That is, a fifth pointer P5 is entered at address 5 of table 35 and this pointer P5 is set to have the same value as the second pointer P2 so that both will now point to address 2 of table 36. Again, the pointer accumulating bin for address 2 of table 36 is incremented to indicate that two pointers now point to address 2 of table 36.

The same procedure repeats for occurrences (6) through (12). There will be a one for one correspondence between each sequential occurrence number (n) and an address $ADDR_{35}n$ in the pointer table 35. Pointer P6 will point to address 3 of table 36 ($P6=ADDR_{36}3$) which has the object name c entered therein. Pointers P7, P8 and P9 will point respectively to addresses 1, 2 and 3 of the object designation table 36. Pointers P10, P11 and P12 will likewise point to addresses 1, 2 and 3 of table 36. Non-occurrences are not recorded as data in table 35.

As the scanning means 32 begins to investigate the fifth row, R5, it finds that the thirteenth occurrence (13) is neighbored by the tenth occurrence (10) and a yet to be investigated fourteenth occurrence (14). The data processor 33 causes address 13 of pointer table 35 to inherit the value of the pointer in address 10 of the pointer table 35. That is, pointer P13 (not shown) will point to address 1 of table 36 which contains the object name a ($P13=P10=ADDR_{36}1$).

Upon investigation of the next occurrence (14) at location R5C4, the scanning means 32 finds that occurrence (14) is directly contacted by occurrences (13), (11) and a yet to be investigated occurrence (15). The data processor 33 will discover upon interrogation of memory means 34 that the pointers, P13 and P11, of respective occurrences (13) and (11) do not point to the same object name. Pointer P13 points to address 1 of table 36 which contains the object name a while pointer P11 points to address 2 of table 36 which contains the object name b.

As before, the computer (data processor 33) can now first realize that the branch formed by occurrences (2), (5), (8), and (11) may have been incorrectly associated with an object name b and should instead have been associated with the object name a. But, here, instead of having to scan back through all the previous pixels of array 100 and all the memory locations in memory 34 corresponding to occurrences, (2), (5), (8) and (11), the computer merely changes the contents of address 2 in the object designation table 36 from b to a as indicated in FIG. 3 by the slash drawn through the b and the a entry to its right. Pointers P2, P5, P8 and P11 already all point to address 2 of table 36. This single act of changing the object name held in $ADDR_{36}2$ automatically corrects the object assignments of all occurrences (2), (5), (8) and (11), branching upwardly from occurrence (14).

When the saddle point (20) occurring at location R7C7 is investigated some time later, the same type of correction will occur again. The computer will realize that occurrences (3), (6), (9), (12), (16) and (18) may have been incorrectly assigned to object name c. Respective pointers P3, P6, P9, P12, P16 and P18 of these occurrences will all be pointing to address 3 of table 36. The error is resolved simply by changing the object name contained at address 3 of table 36 from c to a. In this manner, all six errors are corrected in a single step without having to determine the memory addresses of all the errors.

When scanning window 31 has finished scanning vertically through the array 100, the pointer table 36 will be filled with M pointers, $P_1$ through $P_M$. Zeroes may be used to represent nonpointers in leftover areas of the pointer table 35. The number of pointers, M, in table 35 is equal to the total number of occurrences in the array 100. M will typically be much smaller than the number of pixels, N, in the array 100. This is because background pixels usually outnumber object pixels by a factor of approximately eight to one or better. As such, a significant amount of data reduction (data compression) has taken place by going from the N data points of array 100 to the M data entries of the pointer table 35. The L entries of table 36 will usually be fewer in number than the M entries of table 35. The memory space (M+L) needed for storing tables 35 and 36 in memory means 34 can be substantially smaller than the space needed for storing N pieces of data. ($M+L<2M$, where usually $M<N/8$.) This allows one to either process new arrays 100 of sizes $N_{new}>N_{old}$ larger than previously practical with a given storage space provided in memory means 34 or to reduce the cost of the overall system 30 by decreasing the size of the memory means 34. Such an increase in array size from $N_{old}$ to $N_{new}$ or reduction in the size of the memory means 34 is quite advantageous on its own, but it should be considered in light of the fact that no recursion is necessary. When N is increased, the processing time for completing tables 35 and 36 will grow in a roughly linear manner, as a function of N rather than as a function of N-factorial. Processing time can be shortened, depending on the number of saddle points, by a factor of as much as $(N/6)!/N$ in comparison to previous methods. This can be a substantial reduction even for small arrays of, say 100 pixels. (The N/6 factor given above is based on a worst case hypothesis in which saddle points occur in every second column of a row and such a saddle-point saturated row repeats once every three rows during a downward scan.)

At the end of a one pass scan by the scanning window 31, object designation table 36 will be filled only with valid object names. Zeroes or negative integers may be used in the table 36 to designate no objects at leftover portions of the table. If object names are assigned as sequential integers 1, 2, 3, . . . rather than the a, b, c, . . . designations thus far used, the total number of discrete objects in the scanned array 100 may be determined simply by finding the largest object number (object name) in table 36.

The pointers list, $P_1$–$P_M$, of table 35 may be used in conjunction with the object name list, e.g. names a–z, of table 36 to generate all sorts of useful information. For example, the occurrence density of each object, a, b, c, . . . , can be determined by counting the number of pointers pointing to a particular object name in the object designation table 36. If the number-of-pointers bins of the object designation table 36 had been optionally incremented as described earlier, these bins will already indicate the number of pointers pointing to each object name entry in table 36. The pointer count for each object name in table 36 may be summed and recorded as an entry in the occurrence accumulating bins of table 37 so that the total number of pointers for a given object name (i.e., object name a) can be determined in an orderly fashion.

Figure 7:
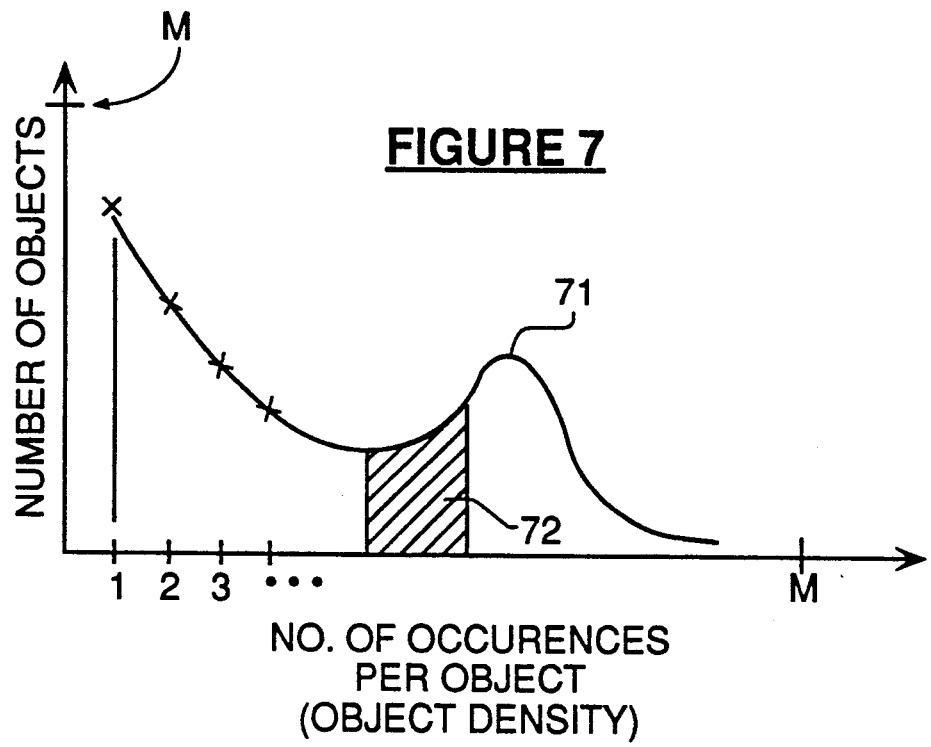
FIG. 7 is a plot of object density versus object population.

Once it is determined that there are I pointers pointing to object name a, J pointers pointing to object name b, K pointers pointing to object c, and so forth, an object density versus object population plot such as shown in FIG. 7 may be readily produced. The number of occurrences in each object would indicate the size of the object or the density of the object. The number of objects belonging to a particular density class may be indicative of the quality of an examined specimen. The graph of FIG. 7 could be displayed on a viewing screen, if desired, plotted on graph paper and/or stored in memory as list of sample points. A peak 71 at some point in the plot may be indicative of an unacceptable number of large defects. It may occur for example, that hairline cracks in a substrate surface are being analyzed and the number of hairline cracks having lengths (or areas) greater than a predetermined threshold are to be kept below a predetermined maximum number for quality control purposes. The area of a particular region 72 under the curve of FIG. 7 may provide information about the number of such cracks. Products having crack profiles exceeding the maximum number could be discarded to improve yield or a processing parameter may be adjusted using real time feed back to reduce the area of region 72 in later analyzed specimens. Other specific uses for the disclosed object identifying method will be described later.

The types of useful information that may be obtained from the data stored in tables 35 and 36 are not limited to the above. By way of further example, it might be useful to know how many saddle points occur in a visual field when the field is scanned in a particular direction (e.g., scanning from bottom to top instead of top to bottom, or scanning diagonally across a specimen instead of vertically). The total number of entries L in object designation table 36 will indicate the total number of saddle points in the visual field 100. By counting the number of object name entries in table 36 having the same object name it can be determined how many saddle points occur in a particular object. This information may be useful for categorizing each of the discrete objects according to attributes other than occurrence density.

As another example, it may be of interest to know whether a particular object has large rather than small branches joining together at a saddle point and what the size (occurrence density) of these branches are. The number-of-pointers data optionally accumulated in table 36 may be used to determine the density of each branch in a particular object. These additional examples are, again, merely illustrative and not intended to limit the scope of the present invention.

A specific routine for exhaustively scanning neighbors of a focal point in a two-dimensional array and automatically correcting improper designations will now be described with reference to FIGS. 4A-4C, 5A-5D and 6. This method will be slightly different from the one described above in that it seeks to minimize the number of interrogations that the computer will make of the limited data viewable through the scanning window.

Figure 4A:
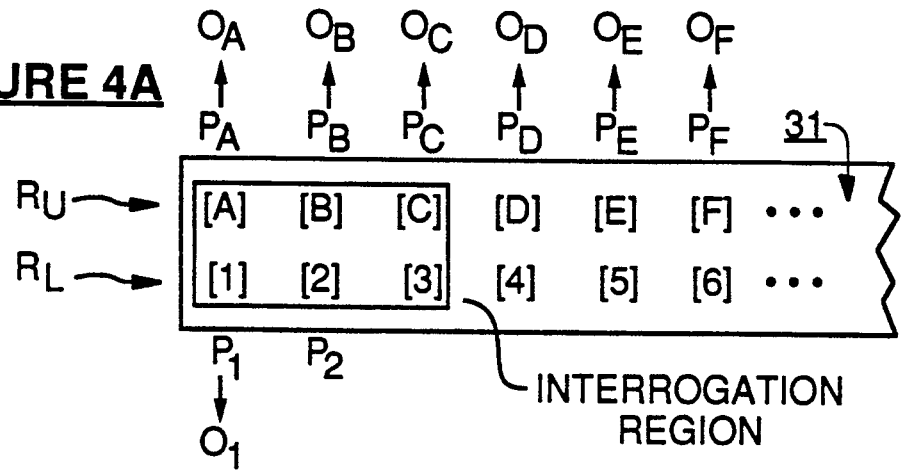
FIGS. 4A-4C are diagrams for explaining a method of identifying discrete objects.

Reference to FIG. 4A will help to explain the nomenclature used below for describing this specific routine. The upper and lower rows of a scanning window 31 are denoted as $R_U$ and $R_L$. Pixels in the upper row $R_U$ are denoted by bracketed capital letters, [A], [B], [C], and so forth. Pixels in the lower row $R_L$ are denoted by bracketed integers, [1], [2], [3], and so forth. If a particular pixel, i.e. [A], contains an occurrence (*) then it will have a corresponding pointer, i.e., $P_A$, associated with it in a pointer table and the pointer will point to a changeable object name, i.e., $O_A$ in an object designation table. If a particular pixel, i.e. [4], does not contain an occurrence (*), there can be no pointer or object name associated with that pixel.

The routine concentrates on an interrogation region composed of no more than six pixels. For the sake of conformity, we will refer to the pixels of the interrogation region as [A], [B], [C], [1], [2], [3], where the first three are arranged in the recited order in an upper row of the interrogation region and the later three are arranged in the recited order directly underneath the former. It should be noted that a memory of just six locations is needed to temporarily store the occurrence data associated with the interrogation window.

Figure 4B:
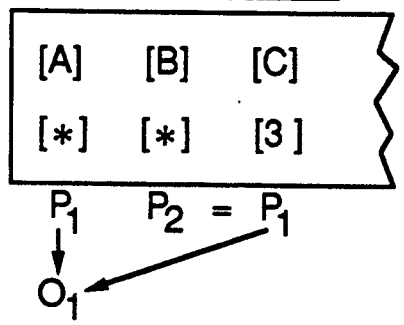
Figure 4C:
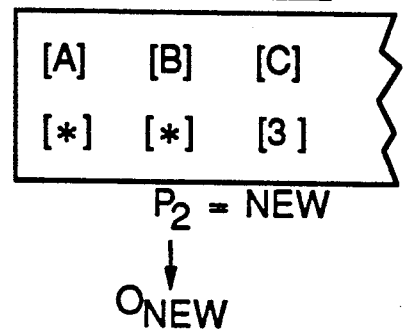

Referring to FIGS. 4B and 4C, an initialization portion of the routine will be described first. The initialization portion focuses only on pixel [2], which will be referred to hereafter as the focal pixel, and another of the six pixels in the interrogation region. It is assumed that the focal pixel [2] always contains an occurrence (*). Pixels in lower row $R_L$ which do not contain an occurrence never become fully investigated focal pixels. Pixel [1] is chosen as the other pixel for the initialization portion as described with reference to FIGS. 4B and 4C. After the initialization portion is completed, this chosen pixel [1] is not looked at again. The chosen pixel [1] is used to quickly determine whether the focal pixel [2] forms an edge of its object or not. A left to right transition from a non-occurrence pixel to an occurrence pixel indicates that the computer might be encountering the edge of a new object. If the chosen pixel [1] contains an occurrence [*] as shown in FIG. 4B, the pointer $P_2$ of the focal pixel is set equal to the pointer $P_1$ of the chosen pixel [1] so that pointer $P_2$ points to the same object name $O_1$ as does the pointer $P_1$ of the chosen pixel [1]. If the chosen pixel [1] does not contain an occurrence as shown by the blank brackets [ ] in FIG. 4C, the pointer $P_2$ of the focal pixel [2] is set to point to a new address in the object designation table and a new object name $O_{new}$ is entered in the new address of the designation table. This completes the initialization phase.

Figure 6:
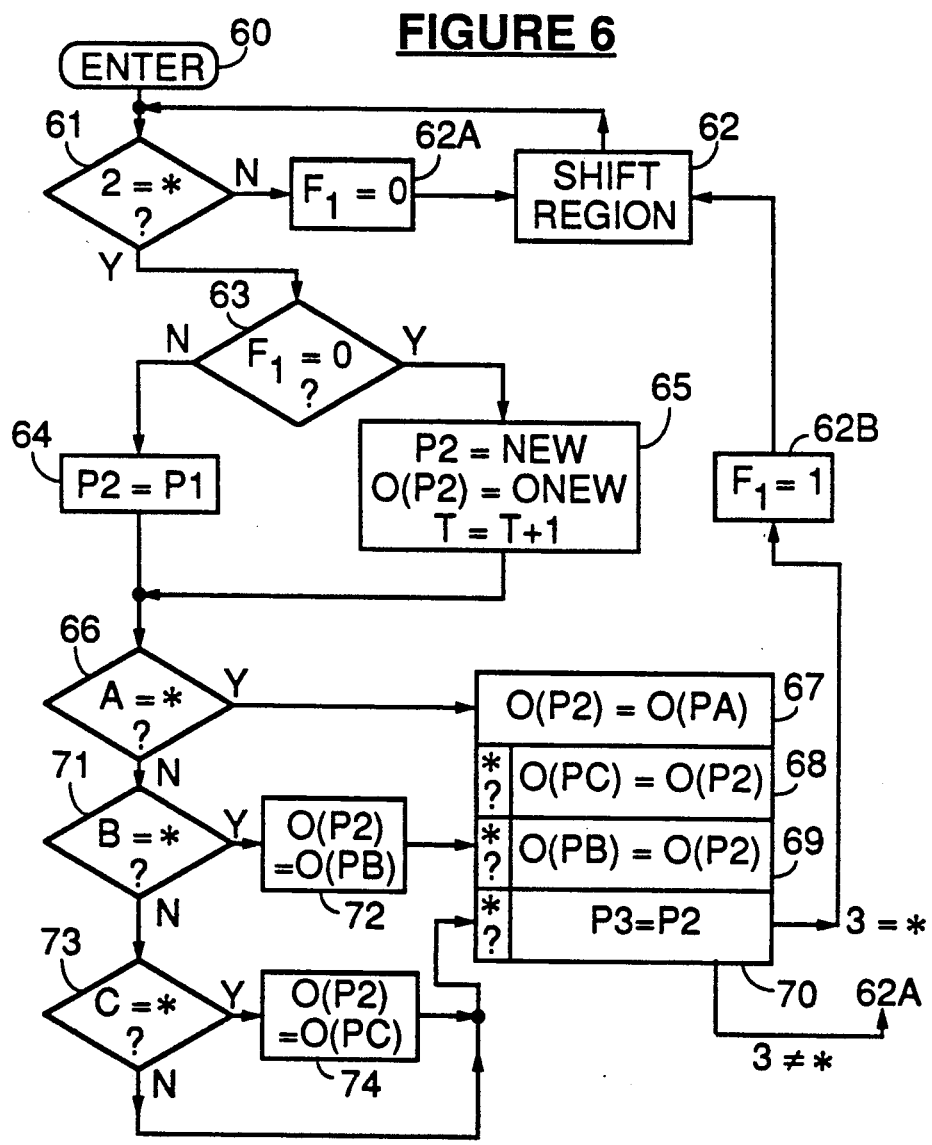
FIG. 6 is a flow chart for explaining the method.

It may be useful to follow what has happened thus far in the flow chart of FIG. 6. Additional details of the routine will be described. The initialization phase begins at step 60. An initialization flag $F_1$ is set to zero prior to scanning the first row $R_1$ of an array (e.g. array 100 of FIG. 3). At step 61 the focal point is interrogated to determine whether it contains an occurrence. If there is no occurrence, flag $F_1$ is zeroed at step 62a, the interrogation region is shifted to the right at step 62. With this shift, the pixels of the next column, to the right of the original focal column, become new pixels [C] and [3], (see FIG. 4A). The previous pixel [3] becomes the new focal pixel [2], the previous pixel [2] becomes the chosen pixel [1] and previous pixel [B] becomes pixel [A]. The loop of steps 61, 62a and 62 is repeated until either an occurrence [*] is detected or the end of the window 31 is reached. The specifics for handling an end of window condition or other such details will not be explained herein since they are well within the capabilities of those skilled in the art. It should be understood that once the interrogation region begins moving left to right, its size can be minimized to two pixels, the new [C] and [3] of each shift. The status of new pixels [A],

[B], [1], [2] are known to be the same as old pixels [B], [C], [2], [3]. Known state minimization techniques can be used to optimize the scan routine if desired.

The initialization flag $F_1$ was set to zero at step 62a to indicate that the new pixel [1] (which was old pixel [2]) does not contain an occurrence. At step 63, this initialization flag $F_1$ is interrogated to determine whether pixel [1] contains an occurrence or not. If it does, the focal pixel [2] is given a pointer $P_2$ having the same value as the pointer $P_1$ of pixel [1] at step 64. If pixel [1] is empty, then pixel [2] is given a pointer $P_2$ pointing to a new address, NEW, in the object designation table at step 65. That new address is filled with a new object name (i.e. (NEW). A transition counter, T, which counts the number of transitions from blank pixels to occupied pixels is incremented at this time. The count in the transition counter T can be used to provide general information about the complexity of the visual field. Complex fields will have a large number of transitions (high frequency of edges) while simpler fields will have fewer transitions (low frequency of edges).

Figure 5A:
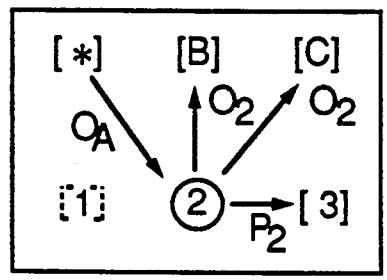
FIGS. 5A-5D are additional diagrams for explaining the method.

Referring to FIG. 5A and step 66 of FIG. 6, the [A]pixel is interrogated to see if it contains an occurrence (*?). If it does, the object name $O(P_A)$ of pixel [A] is copied into the address pointed to by pointer $P_2$ at step 67. This causes pixel [2] to automatically inherit the object name of pixel [A]. Pixel [B] is interrogated at step 8 to see if it contains an occurrence (*?), and if it does, then the object name inherited by pixel [2] from pixel [A] is passed on to the object name entry of pixel [B] in step 8. Pixel [C] is interrogated at step 69 to determine whether it too contains an occurrence (*?). If it does, the object name inherited by pixel [2] is forced into the designation table address pointed to by the pointer $P_C$ of pixel [C] at step 69 so that [C] inherits the object name assigned to [A]. At step 70, pixel [3] is investigated to see if it contains an occurrence (*?). If it does, pixel [3] is given a new pointer $P_3$ having the same value as pointer $P_2$ and a jump is made to step 62b to set the initialization flag $F_1$ equal to 1 before jumping to the shift region step 62. If pixel [3] did not contain an occurrence (*) then no pointer is given to this pixel and instead a jump is made to step 62a where the initialization flag $F_1$ is set to zero before shifting the interrogation region to the right at step 62.

It is important to understand what has happened at steps 68, 69 and 70. If pixel [B] contains an occurrence at step 68 and it turns out that the object name $O(P_B)$ associated with that occurrence was not the same as the object name associated with the occurrence of pixel [A], then this conflict is automatically corrected at step 68 by simply overwriting the old object name pointed to by pointer $P_B$ with the object name of pointer $P_2$. All other occurrences associated with the entry $O(P_B)$ of the object designation table are automatically corrected at the same time. The same thing happens at step 69 for the object name associated with pixel [C] if that pixel contains an occurrence (*). Pixel [3] is in the same lower row $R_L$ as that of the focal pixel [2], it has not been investigated yet, and it is therefore impossible for pixel [3] to have a wrong object name associated with it. If pixel [3] does contain an occurrence, its pointer $P_3$ is set equal to pointer $P_2$ as indicated at step 70 and shown in FIG. 5A.

Figure 5B:
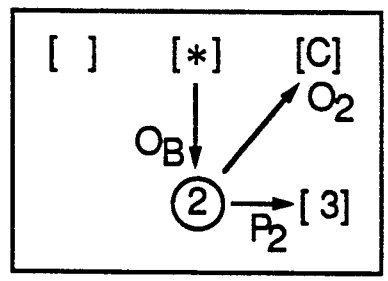

FIG. 5B shows what happens at steps 71, 72, 69 and 70 of FIG. 6. If pixel [A] has been found to be empty and pixel [B] is found to contain an occurrence, pixel [2] inherits the object name $O_B$ of pixel [B], passes the same name on to pixel [C] if the latter contains an occurrence, and sets the pointer of pixel [3] equal to the same value as pointer $P_2$ if pixel [3] contains an occurrence.

Figure 5C:
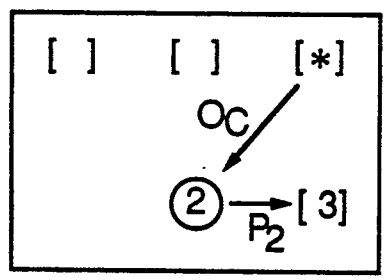

FIG. 5C shows what happens at steps 73, 74 and 70. Pixels [A] and [B] have been found to be empty while pixel [C] is found to contain an occurrence. Pixel [2] inherits the object name of pixel [C] and passes the same on to pixel [3] by means of setting the pointer of pixel [3] if the later contains an occurrence.

Figure 5D:
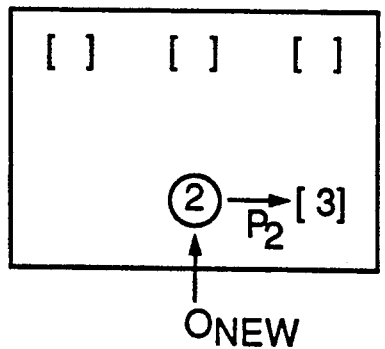

FIG. 5D shows what happens if the result of step 73 is no. The object name $O_{NEW}$ assigned to pixel [2] at step 65 has remained unchanged. If pixel [3] contains an occurrence then this new object name is attached to pixel [3] by setting pointer $P_3$ equal to point $P_2$ at step 70. At some future point, it may be discovered that the new object name $O_{NEW}$ as entered in the designation table and associated with pixels [2] and [3] is improper. This problem will be corrected automatically at one of steps 67–69 by overwriting $O_{NEW}$ if the situation so requires.

The above described object identifying methods and systems are, of course, only exemplary of the present invention. Numerous modifications and variations will become apparent to those skilled in the art. It is expected that a large number of commercial applications will be developed for the disclosed invention. A description of commercial applications presently contemplated is given below.

The first application is directed to the manufacture of planar surfaces. When highly planar surfaces are to be developed by thin film metal deposition or other methods, realignment of atoms in the surface may create microscopic bumps and/or depressions which are referred to as "hillocks." The factors which lead to hillock formation are not yet fully understood but their formation in large sizes is generally undesirable. It is believed that minor changes in the composition of the substrate material or in the raw materials and/or operation of the deposition equipment may aggravate the undesirable formation of large hillocks.

Hillocks are associated with various failure mechanisms in the manufacture of semiconductor devices, thin film memory disks, and other manufacturing processes where a highly planar surface is required. To date, it has been very difficult to study the hillock population of a surface because such hillocks occur at the microscopic level in large numbers and the mere tasks of counting them and further categorizing them by size and/or shape has been considered too time consuming.

Figure 8:
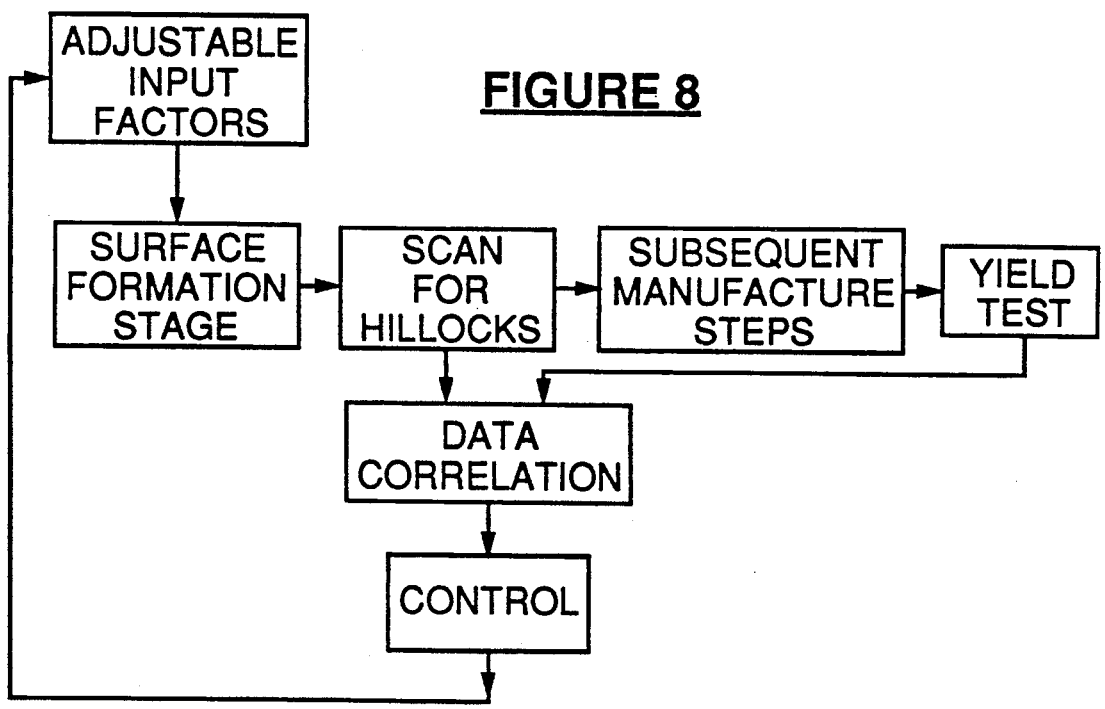
FIG. 8 is a block diagram of a control system for improving manufacturing yield in a multi-stage manufacturing line.

The present invention permits one to develop a hillock population versus hillock density graph like the graph shown in FIG. 7 in an automated manner. It is believed that improved process control can be realized simply from controlling the hillock density distribution curve at the initial phase of device manufacture by means of a feedback system such as shown in FIG. 8. Real time feedback from later stages of manufacture are expected to allow one to determine (i.e. by statistical correlation) what types of hillock density curves are acceptable and what type lead to failure at later stages of the manufacturing process. Substrates with nonacceptable hillock distribution profiles can be discarded at the front end of a manufacturing line to improve yield at subsequent stages of the manufacturing line. Additionally, adjustments may be possible to input variables of one or more surface forming stages of the manufacturing line so that the hillock population curves are brought into an acceptable range of predetermined curve forms.

A second contemplated application concerns the formation of silicon nodules or precipitates in the metallization layer of an integrated circuit. The metallization layer is usually formed of an aluminum based metal alloy which is saturated with silicon atoms. Saturation with silicon atoms is desired in order to create a good ohmic contact at a bonding point between the metal and an exposed portion of a silicon substrate. Some of the silicon atoms in the metallization layer can precipitate out of the saturated alloy to form silicon nodules which pass through the metallization layer or interpose themselves between the metallization layer and lower layers of the integrated circuit (i.e. insulative silicon dioxide layers). If these nodules become too large, they can lead to device failure. The nodule formation problem becomes particularly acute when it is desired to form conductive strips of widths less than one micron in the metallization layer. Silicon nodules are known to be capable of growing to sizes as large as one-half to one micron in diameter. If a large nodule appears by happenstance at a point where a narrow conductive strip is to be formed, the nodule can create an open circuit. Control of the stock of aluminum alloy used for the metallization layer formation step can help to reduce the number of failures attributed to this mechanism but a method is needed for correlating the formation of oversized nodules with particular stocks of material used to create the metallization layer.

In accordance with the present invention, samples of in-process integrated chips or wafers are removed from the process line after the metallization layer has been formed but before the metallization layer is patterned. The metallization layer is etched away using a suitable etchant such as phosphoric acid to thereby expose silicon nodules which may have formed between the metal layer and an insulative layer (silicon dioxide layer) below. Almost all of the exposed silicon nodules will remain attached to the insulative (silicon dioxide) layer. The attached nodules are then scanned under an appropriate scanning instrument such as a scanning electron microscope (SEM) and the data from such scanning is processed in accordance with the above described object identifying methods in order to generate a nodule density/population curve like the curve shown in FIG. 7. Correlations between the formation of differently sized nodule populations and previous processing steps may then be found using appropriate statistical methods. Control of the nodule density profile, by discarding overly saturated aluminum stock or/and by adjusting process parameters related to nodule formation, is expected to improve yields on semiconductor manufacturing lines substantially.

A third contemplated application for the disclosed invention is in the biological fields. The above object identification and categorization methods may be applied to biological samples to determine the size and number of microorganisms present in a (bacterial) culture at different times. This information may be used to study the growth pattern of the microorganisms or to identify the microorganisms.

While the above methods have been described in the context of two dimensional visual fields and furthermore in the context of a simple black/white distinction between occurrence and no occurrence; it will become apparent to those skilled in the art that the methods and system structures described above may be expanded to problems involving three dimensional spatial grids or grids of higher dimensions, and to object classification problems which require more information than the mere occurrence or nonoccurrence of a specific trait. As such, the present invention should not be limited by the above descriptions but should rather be defined to broadly encompass the subject matter of the following claims.

I claim:

1. A method for identifying discrete objects in a visual field composed of an array of pixels, comprising:
   establishing a first table for recording a set of pointers, each of said pointers being associated with the occurrence of a prespecified condition in a corresponding one of said pixels;
   establishing a second table for recording one or more object names;
   setting the pointers of the pointer table to point to one or more object names in the second table; and
   changing one of the object names in the second table when it is found that the pixels associated therewith through their respective pointers belong to an object of a different name;
   counting the number of pointers pointing to one or more specific object names recorded in the second table.

2. The method of claim 1 further comprising the step of:
   passing a scanning window, smaller than the array, across the array to detect the occurrence of the prespecified condition in one or more of said pixels.

3. The method of claim 2 wherein the scanning window passes across the array just once.

4. The method of claim 2 wherein the scanning window covers no more than six pixels at a time.

5. The method of claim 1 further comprising the steps of:
   digitizing a view of a surface; and
   specifying said occurrence condition to be the occurrence of a hillock.

6. The method of claim 1 further comprising the steps of:
   digitizing a view of a nodule covered semiconductive substrate; and
   specifying said occurrence condition to be the occurrence of a nodule.

7. The method of claim 1 further comprising the step of generating an occurrence density plot on the basis of said pointer counting step.

8. The method of claim 7 further comprising plotting occurrence density against the number of discrete objects having such occurrence density.

9. The method of claim 7 further comprising: controlling a manufacturing process parameter in accordance with said density plot.

10. An apparatus for identifying discrete objects in an array of pixels, comprising:
    scanning means for scanning the pixels of the array and generating data representing one or more prespecified attributes of the pixels;
    processor means for processing data received from the scanning means;
    memory means for recording data generated by the processor means;
    wherein the memory means is structured to contain a first table comprises of one or more pointers respectively associated with one or more of the pixels in the array which have a prespecified attribute and the memory means is further structured to contain a second table composed of object designations for assigning object names to said pixels indirectly through said pointers of the first table, and wherein said memory means is structured to contain a third table comprises of one or more bins for recording the number of pointers pointing to an object designation in the second table.

11. The apparatus of claim 10 wherein said scanning means scans the pixels sequentially via a scanning window that is smaller than the array.

12. The apparatus of claim 10 wherein the processor means includes means for changing an object designation in said second table.

13. An apparatus for identifying discrete objects in an array of pixels, comprising:

a first memory means for storing object names;

a second memory means for storing pointers pointing to the object names, each pointer indirectly linking a pixel having a prespecified attribute to an object name in the first memory means;

name changing means, coupled to the first memory means, for changing an object name stored in the first memory means; and means for counting the number of pointers linking pixels to one or more specific object names stored in the first memory means.

14. The apparatus of claim 13 further comprising means responsive to said counting means, for generating an occurrence density plot.

15. The apparatus of claim 14, further comprising means for plotting occurrence density against the number of discrete objects having such occurrence density.

16. The apparatus of claim 14 further comprising means for controlling a manufacturing process parameter in accordance with said density plot.

17. A method for identifying an object in a visual field, comprising the steps of:

identifying an interrogation region of said visual field;

identifying a focal pixel on a scan line in said interrogation region corresponding to part of an object;

initializing updating a pointer table and an object designation table with respect to said focal pixel, comprising the steps of:

determining whether said focal pixel forms an edge of an object;

adding a new object designation to said object designation table and a pointer thereto in said pointer table if in accordance with said object edge determining step, said focal pixel is an object edge pixel; and adding to said pointer table a copy of an existing pointer in said pointer table corresponding to a pixel preceding said focal pixel if in accordance with said object edge determining step, said focal pixel is not an object edge pixel; and completing updating said pointer table and said object designation table with respect to said focal pixel, comprising the steps of:

identifying a first occurrence, if any, on a preceding line within said interrogation region;

amending the object designation in said object designation table corresponding to said focal pixel in accordance with an object designation corresponding to said first occurrence;

following said focal pixel object amending step, amending an object designation corresponding to a subsequent occurrence, if any, on said preceding line within said interrogation region in accordance with the object designation corresponding to said focal pixel;

identifying an occurrence, if any, subsequent to said focal pixel and within said interrogation region; and adding to said pointer table a copy of the pointer in said pointer table corresponding to said focal pixel, said pointer copy corresponding to said occurrence subsequent to said focal pixel.

18. The method of claim 17, wherein:

said interrogation region is a rectangular interrogation region of two lines having three pixels each, and said focal pixel is a middle pixel in one of said lines;

said preceding pixel of said initializing step and said focal pixel are in the same line;

said update completing step further comprises amending object designations corresponding to all occurrences, if any, subsequent to said first occurrence, on said preceding line in said interrogation region in accordance with the object designation corresponding to said focal pixel; and said occurrence subsequent to said focal pixel in said completing step is an occurrence in a pixel in the same line as the focal pixel.

* * * * *